(12) United States Patent
Corma Canós et al.

(10) Patent No.: US 7,371,318 B2
(45) Date of Patent: May 13, 2008

(54) METHOD AND CATALYSTS FOR THE ELIMINATION OF SULPHUR COMPOUNDS FROM THE DIESEL FRACTION

(75) Inventors: Avelino Corma Canós, Valencia (ES); Marcelo Eduardo Domine, Valencia (ES); Cristina Martinez Sánchez, Valencia (ES)

(73) Assignees: Consejo Superior De Investigaciones Cientificas, Madrid (ES); Universidad Politecnica De Valencia, Valencia (ES)

( * ) Notice: Subject to any disclaimer, the term of this patent is extended or adjusted under 35 U.S.C. 154(b) by 764 days.

(21) Appl. No.: 10/683,557

(22) Filed: Oct. 10, 2003

(65) Prior Publication Data

US 2004/0140247 A1    Jul. 22, 2004

Related U.S. Application Data

(63) Continuation of application No. PCT/ES02/00179, filed on Apr. 11, 2002.

(30) Foreign Application Priority Data

Apr. 12, 2001    (ES) ............................... 200100960

(51) Int. Cl.
C10G 27/04    (2006.01)
C10G 27/10    (2006.01)
(52) U.S. Cl. .................. 208/208 R; 208/213; 208/196; 208/291; 208/295
(58) Field of Classification Search ............ 208/208 R, 208/189, 196, 213
See application file for complete search history.

(56) References Cited

U.S. PATENT DOCUMENTS

| | | |
|---|---|---|
| 3,341,448 A | 9/1967 | Ford et al. |
| 3,642,833 A | 2/1972 | Wulff et al. |
| 3,816,301 A | 6/1974 | Sorgenti |
| 3,919,402 A | 11/1975 | Guth et al. |
| 3,923,843 A | 12/1975 | Wulff |
| 4,410,501 A | 10/1983 | Taramasso et al. |
| 4,830,733 A | 5/1989 | Nagji et al. |
| 5,910,440 A | 6/1999 | Grossman et al. |
| 6,368,495 B1 | 4/2002 | Kocal et al. |

FOREIGN PATENT DOCUMENTS

| | | |
|---|---|---|
| FR | 2 730 722 | 8/1996 |
| WO | WO 94/02245 | 2/1994 |
| WO | WO 94/29022 | 12/1994 |
| WO | WO 00/07710 | 2/2000 |
| WO | WO 00/34181 | 6/2000 |
| WO | WO 00/44670 | 8/2000 |
| WO | WO 00/47696 | 8/2000 |
| WO | WO 01/37629 | 5/2001 |
| WO | WO 01/48119 | 7/2001 |

OTHER PUBLICATIONS

V. Huela et al, "Mild Oxidation with $H_2O_2$ over Ti-Containing Molecular Sieves . . . ", Journal of Catalysis, Mar. 10, 2001, vol. 198, No. 2, pp. 179-186.
Kirk-Othmer, Encyclopedia of Chemical Technology, vol. 12, Fourth Edition, Fuel Resources to Heat Stabilizers, 1994.
Abhijeet P. Borole, et al, Biological Desulfurization of Chemically-Oxidized Sulfur Species in Middle Distillate Fuels, pp Mar. 2000, pp. 689-691.
Dolbear et al, Selective Oxidation as a Route to Petroleum Desulfurization, Mar. 2000, pp. 375-378.
Bond et al, DMSO Extraction of Sulfones from Selectively Oxidized Fuels, Mar. 1999, pp. 199-201.
Collins et a, Oxidative desulphurisation of oils via hydrogen peroxide and heteropolyanion catalysis, Journal of Molecular Catalysis A: Chemical 117 (1997) pp. 397-403.
Kabe Toshiaki, P11140462A2: Desulfurization of Liquid Containing Organic Sulfur Compound, 1999.
Ravinder S. Reddy et al, Sulfoxidation of Thioethers using Titanium Silicate Molecular Sieve Catalyst, National Chemical Laboratory, Sep. 1991.
Vasile Hulea et al, Thioether oxidation by hydrogen peroxide using titanium-containing zeolites as catalysts, Journal of Molecular Catalysis A: Chemical 111 (1996) 325-332.
T. Blasco et al, Direct Syntesis and Characterization of Hydrophobic Aluminum-Free Ti-Beta Zeolite, J. Phys. Chem. B 1998, 102, 75-88.
Jan C. van der Waal et al, Zeolite titanium beta: A versatile epoxidation catalyst. Solvent effects, Journal of Molecular Catalysis A: Chemical 124 (1997) 137-146.
J.C. van der Waal et al, Synthesis and characterization of aluminum-free zeolite titanium beta using di (cyclohexylmethyl) dimethylammonium as a new and selective template, Microporous and Mesoporous Materials 25 (1998) 43-57.
A. Corma et al, Activity of Ti-Beta Catalyst for the Selective Oxidation of Alkenes and Alkanes, Journal of Catalysis 145, 151-158 (1994).
A. Corma et al, Solvent Effects during the Oxidation of Olefins and Alcohols with Hydrogen Peroxide on Ti-Beta Catalyst: The Influence of the Hydrophilicity-Hydrophobicity of the Zeolite, Journal of Catalysis 161, 11-19 (1996).
A. Corma et al, Influence of silylation on the catalytic activity of Ti-MCM-41 during epoxidation of olefins, Studies in Surface Science and Catalysis 129, pp. 169-178, 2000.
Avelino Corma et al, One step synthesis of highly active and selective epoxidation catalysts, formed by organic-inorganic Ti containing mesoporous compositves, Chem. Commun., 1998, pp. 1899-1900.

*Primary Examiner*—Tam M. Nguyen
(74) *Attorney, Agent, or Firm*—Klauber & Jackson L.L.C.

(57) ABSTRACT

The invention relates to a process for the elimination of sulphur compounds from the diesel fraction, which is characterized in that an oxidising reaction of said sulphur compound is carried out by using at least an organic-inorganic composite as catalyst, said composite comprising Si, Ti; and silicon bonded to carbon, and organic and inorganic hydroperoxides as oxidizing agents. According to the inventive process, said organic-inorganic composite can be obtained by a method comprising a post-synthesis silylation step.

55 Claims, No Drawings

METHOD AND CATALYSTS FOR THE ELIMINATION OF SULPHUR COMPOUNDS FROM THE DIESEL FRACTION

RELATED APPLICATIONS

The present application is a Continuation of co-pending PCT Application No. PCT/ES02/00179, filed Apr. 11, 2002, which in turn, claims priority from Spanish Application Serial No. 200100960, filed Apr. 12, 2001. Applicants claim the benefits of 35 U.S.C. §120 as to the PCT application and priority under 35 U.S.C. §119 as to said Spanish application, and the entire disclosures of both applications are incorporated herein by reference in their entireties.

TECHNICAL FIELD OF THE INVENTION

The present invention refers to the technical field of heterogeneous catalysis, especially to the sector of the refining of hydrocarbons and specifically to the refining of the diesel fraction.

STATE OF THE ART PRIOR TO THE INVENTION

The fractions of the petroleum distillate usually used as diesel feed are comprised in general and in the greater part of the diesel fuels between an initial distillation temperature of more than 160° C. and a range between 290° to 360° C., wherein 90% is distilled, depending on the grade of combustible fuel. (Kirk-Othmer Encyclopaedia of Chemical Technology, vol. 12, p. 384, 4th Edition, M. Howe-Grant, Editorial, 1996), and contain between 1 and 4% of sulphur compounds of high molecular weight, fundamentally benzothiophene, dibenzothiophene, and their respective alkylated derivatives. These compounds are one of the major causes of pollution, because when subjected to combustion they become sulphur oxides, which on release into the atmosphere give rise to the formation of oxyacids which contribute to the phenomenon known as acid rain.

The legal requirements which have led to the gradual reduction of the sulphur contents in gasoline and diesel fractions, stimulated major development of the processes of hydro-desulphurisation (HDS), which have dominated the desulphurisation of liquid fuels extensively in the past. However, the cost thereof, prohibitive for most of the small and medium-sized refineries, and the necessity for greater decreases in the levels of sulphur in the composition of the gasoline and diesel fractions, have combined to motivate the development of alternative technologies which, by themselves or in combination with those already existing produce a marked decrease in the S content to a range of 10-100 ppm.

Diverse alternative or complementary processes have been examined for desulphurisation of gasoline and diesel, like direct adsorption (Nagi et al. U.S. Pat. No. 4,830,733, 1983), bio-processing (M. J. Grossman et al., U.S. Pat. No. 5,910,440, 1999; A. P. Borole et al., ACS Div. Pet. Chem. Preprints, 45, 2000) and selective oxidation (S. E. Bonde et al., ACS Div. Pet. Chem. Preprints, 44 [2], 199, 1998; E. D. Guth et al., U.S. Pat. No. 3,919,405, 1975; J. F. Ford et al., U.S. Pat. No. 3,341,448, 1967). In the case of the processes of oxidative desulphurisation (ODS), an economical system is sought which is sufficiently selective to oxidise the sulphur compounds, increasing thereby their polarity and molecular weight to facilitate their subsequent separation by extraction or distillation. To date no commercial oxidative desulphurisation process has been developed due fundamentally to the combination of regulatory and economic requirements on an industrial scale, although there is a great variety of them under development (S. E. Bonde et al., ACS Div. Pet. Chem. Preprints, 45, 375, 2000).

The elimination of sulphur present in liquid fuels as sulphides, disulphides and mercaptans, can be carried out by making use of organic peroxyacids, like peroxyacetic acid which allows reductions of 95% in the sulphur content of some gasolines by working at temperatures between 2 and 100° C. (S. E. Bonde et al., ACS Div. Pet. Chem. Preprints, 44[2], 199, 1998). Gasoline can also be treated with heteropolyacids of the peroxotungsten phosphates type in two-phase systems, with $H_2O_2$ as oxidiser and phase transfer agents, which are capable of oxidising mercaptans and dibenzothiophenes although they are less effective with the thiophenic and benzothiophenic compounds (F. M. Collins et al., J. Mol. Catal. A: Chem., 117, 397, 1997). The use of solid catalysts, among them the microporous titanosilicates of the type TS-1 and TS-2 in liquids which contain sulphur compounds achieve low conversion levels to the corresponding sulphones (T. Kabe JP-11140462-A2, 1999).

In general, the selective oxidation of compounds of the family of the benzothiophenes, dibenzothiophenes and their respective substituted alkyl, di-alkyl and tri-alkyl counterparts, main components of the diesel fraction, is problematic and has not been performed with total success up to now. The catalysts of the type TS-1 and TS-2, based on microporous titanosilicates with zeolitic structure (M. Taramasso et al., U.S. Pat. No. 4,410,501, 1983), allow the selective oxidation of different sulphides with oxygenated water (R. S. Reddy et al., J. Chem. Soc., Chem. Commun., 84, 1992; V. Hulea et al., J. Mol. Catal. A: Chem., 111, 325, 1996); but their small pore opening renders their use impossible in processes in which larger molecules are involved as is the case of the benzothiophenes, dibenzothiophenes, and their respective alkylated counterparts.

DESCRIPTION OF THE INVENTION

The object of the present invention is a process for the elimination of sulphur compounds from the diesel fraction characterized in that it comprises carrying out a reaction of oxidising said sulphur using as catalyst at least one organic-inorganic composite which comprises at least:

Si,

Ti and silicon bonded to carbon and using organic or inorganic hydroperoxides as oxidising agents. In accordance with the invention, the catalyst can also be a combination of a plurality of different organic-inorganic composites, each organic-inorganic composite comprising Si Ti, and silicon bonded to carbon.

The catalysts and the process according to the invention, are useful for the elimination of sulphur compounds from the diesel fraction, or from hydrotreated diesel fractions and which hereinafter will also be termed in a general fashion diesel fraction, by means of selective oxidation, using organic or inorganic hydroperoxides as oxidising agents and a catalyst, or a mixture of catalysts, which consists of an inorganic organic composite based on micro- and mesoporous solids, in general microporous solids which contain channels with rings of 12 or more members, as well as ordered mesoporous materials, as well as amorphous silica, all of them containing titanium in their composition, which is introduced in the synthesis stage, or in a treatment following the synthesis. By means of this selective oxidation, the sulphur compounds present in the diesel fraction, are transformed into other products with a different boiling point and/or different polarity which have a boiling point above the boiling range of the diesel and/or which can be more easily extracted by distillation or liquid-liquid extraction following conventional techniques.

According to the process of the present invention, said organic-inorganic composite which comprises at least Si, Ti and silicon bonded to carbon is obtained by means of a process which comprises a silylation stage during synthesis or by means of a process which comprises a stage of silylation after synthesis. Said organic-inorganic composites can be a microporous molecular sieve which comprises at least Si, Ti and silicon bonded to carbon, or a mesoporous molecular sieve which comprises at least Si, Ti and silicon bonded to carbon, or they can consist of amorphous inorganic siliceous solids chemically combined with Ti in proportions of between 0.2 and 8% by weight of Ti in oxide form in the total catalyst, and which contain silicon bonded to carbon.

A convenient microporous molecular sieve has the following chemical formula in its calcined and anhydrous state:

$$y(A_{1/n}^{n+}XO_2):tTO_2:SiO_2:xTiO_2$$

wherein:
X represents at least a trivalent element,
y lies between 0 and 0.2,
A represents mono-, di- or trivalent cations, or mixtures of these,
n=1, 2 or 3,
T represents at least one tetravalent element other than Si and Ti,
t lies between 0 and 1, and
x lies between 0.0001 and 1.

Said microporous molecular sieve is synthesized in the presence of compounds which contain Si—C groups, or is subjected to a stage of post-synthesis silylation creating Si—C bonds.

The precursor of a mesoporous molecular sieve employed as a catalyst can have the chemical formula:

$$y(A^{n+}_{1/n}XO_2):tTO_2:(1-m)S_2O_2:xTiO_2:mR_{(4-p)}SiO_{p/2}:sS$$

wherein:
x lies between 0.005 and 0.1,
X represents at least a trivalent element,
y lies between 0 and 0.2,
A represents one or more mono-, di- or trivalent compensating cations, or mixtures of these,
n=1, 2 or 3,
T represents tetravalent elements other than Si and Ti,
t lies between 0 and 1, and preferably between 0 and 0.2,
S represents an organic compound,
s can vary between 0 and 0.5,
m lies between $10^{-6}$ and 0.66,
p lies between 3 and 1,
and wherein R is an alkyl or aromatic group, or a combination of both, which comes from the silylation agent which contains the Si—C bonds.

The organic compound corresponding to the S group is extracted by chemical means and the mesoporous molecular sieve undergoes a post-synthesis treatment with a silylation agent which gives rise to the formation of new Si—C bonds.

Among said micro- and mesoporous solid materials, can be mentioned for example, among the microporous zeolites Beta, ITQ-7, Mordenite, UTD-1 and in general microporous solids which contain channels with rings of 12 or more members, or among the mesoporous materials, mention can be made of ordered mesoporous materials for example MCM-41, MCM-48, SBH-15, HMS, and other amorphous types, like amorphous silica. Titanium is introduced in the synthesis stage, or in a treatment following the synthesis. Also, said materials can have organic groups anchored on their surface. The oxidising agents are organic hydroperoxides like for example t-butyl hydroperoxide or cumene hydroperoxide, or inorganic oxidisers like hydrogen peroxide or sodium hypochlorite.

By means of this selective oxidation, the sulphur compounds present in the diesel fraction are transformed into other products with different boiling point and different polarity which have a boiling point above the boiling range of diesel and/or can be more easily extracted by distillation or extraction following conventional techniques. By means of the process of the present invention high conversion and selectivity levels are achieved in the oxidation of said sulphur compounds.

The oxidation of the sulphur compounds usually present in the diesel fraction is carried out by bringing a reactive mixture into contact which contains the aforementioned fraction and the organic or inorganic hydroperoxide with the solid micro- or mesoporous catalyst containing Si—C species, the silica with anchored Ti, or a mixture of these at a temperature of between 20 and 150° C. during reaction times which can vary between 2 minutes and 24 hours depending on the catalyst and on the reaction conditions employed. The ratio by weight of the diesel fraction to catalyst lies between 5 and 500, and preferably between 10 and 300, the ratio by weight between the diesel fraction and oxidising agent being between 600 and 10, and preferably between 400 and 30. The hydrophilic—hydrophobic properties of the catalyst can be modified by means of the synthesis conditions whereby the molecular sieves are obtained, or by means of anchoring organo-siliceous compounds on the surface of the micro- or mesoporous solid or of the amorphous silica, and adapting these to the specific characteristics of the reagents. The incorporation of titanium in the molecular sieves containing pores with rings of 12 or more members, or in mesoporous materials, can be carried out by means of direct synthesis, wherein a titanium precursor is added to the synthesis gel, or, by means of the subsequent anchoring of titanium compounds on the surface of the micro and mesoporous materials, giving rise to isolated species of Ti after a process of calcination.

As examples of catalysts employed, a description is given below of those formed by Ti-Beta, Ti-MCM-41 and Ti-aerosil, as well as those of Ti-MCM-41 and Ti-aerosil, containing Si—C groups.

The catalysts based on the microporous material which are described, have the following chemical composition in their anhydrous and calcined state $$y(A_{1/n}^{n+}XO_2):tTO_2:SiO_2:xTiO_2$$

wherein:
X corresponds to a trivalent element like for example Fe, Al, B, Ga, Cr or a mixture of these, and y lying between 0 and 0.2,
A corresponds to mono-, di- or trivalent cations, or mixtures of these, n being equal to 1, 2 or 3, T corresponds to tetravalent elements other than Si and Ti, like for example V, Sn, t lies between 0 and 1, and preferably between 0 and 0.2, and x lies between 0.0001 and 1, and preferably between 0.001 and 0.5.

As a general example of microporous material, the preparation is described of a Beta zeolite containing Ti. The process consists of heating to temperatures of between 90 and 200° C., a reaction mixture which contains a silicon source (amorphous silica, colloidal silica, silica gel, tetraalkylorthosilicate, etc., preferably amorphous silica or tetraalkylorthosilicate), a titanium source (alkoxide or halide, preferably tetraethoxide, tetrapropoxide or tetrabutoxide of Ti), a structure director cation (preferably tetraethyl ammonium, TEA), water, optionally $H_2O_2$ and optionally a source of fluoride anions (hydrofluoric acid, ammonium fluoride, etc.), the presence of alkaline cations being avoided. In the case of using fluoride anions, the source of these and of the organic cations is chosen in such a way that the final pH, after the crystallization takes place, is in the range 6 to 12, preferably in the range 8-9.5. In the event of not using fluoride anions the final pH is greater than 10.5. The composition of the synthesis mixture is characterized by the following ranges of molar ratios:

$H_2O/SiO_2$=4-50, preferably 4-20, more preferably 4-10
TEAOH/$SiO_2$=0.125-0.80, preferably 0.15-0.72
HF/$SiO_2$=0-2
$SiO_2$/$TiO_2$=2-10000
$H_2O_2$/$TiO_2$=0-50, preferably 0-20.

In order to favour the crystallisation it may be convenient to add zeolite Beta crystals to the reaction mixture, in order to act as seeds. These crystals can be added as a dry solid, as a suspension of the crystals in an appropriate liquid or as a preorganised gel.

In the case of using $F^-$ anions in the synthesis, the recovery of the zeolite can be done by means of separating its mother water by filtration, whilst in the case of not using them, centrifuging is necessary for the separation of the solid. As a result materials of high crystallinity are obtained which have an X-ray diffraction pattern coincident with that of the zeolite Beta (U.S. Pat. No. 28,341) and which can be calcined to eliminate the occluded organic material. An appropriate method of calcination consists of heating in an atmosphere of air, a vacuum, $N_2$ or another inert gas to temperatures higher than 400° C., preferably higher than 500° C.

The materials obtained in presence of $F^-$ anions have, in general, a higher crystallinity than those synthesized in an $OH^-$ medium, due to the absence of connectivity defects of the type Si—$O^-$ or Si—OH. Likewise, the zeolites prepared in the presence of $F^-$ have a marked hydrophobic nature, due also to the absence of connectivity defects, whilst those obtained in the absence of $F^-$ have hydrophilic properties (T. Blasco et al., J. Phys. Chem. B, 1998, 102, 75).

The catalysts based on zeolite Beta have an intense band in the UV-Vis spectrum centred around 220 nm, which indicates the presence of Ti in tetrahedral environments and are active and selective in oxidation reactions of sulphides in general, and of alkyl- or aryl-sulphides, thiophene, alkyl-thiophenes, benzothiophene, alkyl-benzothiophenes, without being restrictive in particular.

The catalyst based on Ti-Beta zeolite can also be prepared in and $OH^-$ medium following, for example, the methods described in the literature (see as non-restrictive examples of the synthesis of Ti-Beta zeolite in $OH^-$ medium: D. R. C. Huybretchs et al. (Exxon Chem. Pat., Inc., USA) WO-9402245 Al, 1994; J. C. van der Waal et al., J. Mol. Catal. A: Chem., 124, 137, 1998; Microp. and Mesop. Mat., 25, 43, 1998; A. Corma et al., J. Catal., 145, 151, 1994 and 161, 11, 1996; T. Blasco et al., J. Phys. Chem. B, 102, 75, 1998).

In these catalysts, in a stage during the synthesis or in a post-synthesis stage, species are introduced which contain Si—C bonds, giving rise to the organic-inorganic composite which is used in the process of elimination of sulphur compounds of the present invention.

In another particular embodiment of the process of the present invention the precursor of the catalyst based on the mesoporous material of the type MCM-41 has the following molar composition:

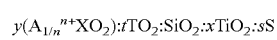

$y(A_{1/n}{}^{n+}XO_2):tTO_2:SiO_2:xTiO_2:sS$

Wherein x can vary between 0.001 and 0.1; X corresponds to a trivalent element like for example Fe, Al, B, Ga, Cr or mixtures thereof, y lying between 0 and 0.2 and preferably between 0 and 0.1. A corresponds to one or more mono-, di- or trivalent compensating cations, or mixtures thereof, and n=1, 2 or 3. T corresponds to tetravalent elements other than Si and Ti, like for example V, Sn, and t lies between 0 and 0.3, and preferably between 0 and 0.2. S can be an organic compound, like for example a cationic, anionic or neutral surfactant. The cationic surfactants respond to the formula $R_1R_2R_3$, $R_4Q$ wherein Q is nitrogen or phosphorus and wherein at least one of the substituents $R_1$, $R_2$, $R_3$ or $R_4$ is an aryl or alkyl group containing more than 6 atoms of carbon and less than 36, and each of the remaining groups $R_1$, $R_2$, $R_3$ or $R_4$ is a hydrogen atom, an aryl or alkyl group with less than five carbon atoms. Also included within the cationic surfactants which can be incorporated in the composition of the gel are the so-called geminal surfactants, $R_1R_2R_3QR_4QR_1R_2R_3$ or $R_1R_2R_3Q(R_4R_5QR_6QR_4R_5)QR_1R_2R_3$ wherein Q is a nitrogen or phosphorus atom and at least one of the substituents $R_1$-$R_6$ is an aryl or alkyl group with more than six carbon atoms and less than 36, and each of the remaining groups R1-R6 are hydrogen atoms, aryl or alkyl groups with less than five carbon atoms, or mixtures of these. In these cases two of the groups $R_1$, $R_2$, $R_3$ or $R_4$ can be interconnected giving rise to cycled compounds. The cationic surfactants are introduced in the composition of the synthesis gel in the form of hydroxide, halide, nitrate, sulphate, carbonate or silicate or mixtures thereof. Non-restrictive examples of these are cetyltrimethylammonium, dodecyltrimethylammonium, cetylpyridinium, cetyltrimethylphosphonium, etc.

S can also refer to a neutral surfactant, in which case they respond to the formula $R_1R_2R_3Q$ wherein Q is nitrogen or phosphorus and where at least one of the substituents $R_1$, $R_2$, or $R_3$ is an aryl or alkyl group containing more than 6 carbon atoms and less than 36, and each of the remaining groups— $R_1$, $R_2$, or $R_3$ is a hydrogen atom, an aryl or alkyl group with less than five carbon atoms, being dodecylamine, cetylamine and cetylpyridinium non-restrictive examples. Also able to act as neutral surfactants are compounds which respond to the formula nR-EO which consist of alkylpolyethylene oxides, alkyl-aryl-polyethylene oxides and copolymers of alkylpolypropylene and alkylethylene, the commercial surfactants called Tergitol 15-S-9, Triton X-114, Igepal RC-760, Pluronic 64 L, Tetronic and. Sorbitan being non-restrictive examples. It is also possible to include in the formulation esters derived from fatty acids obtained through reaction with short-chain alcohols, sugars, amino acids, amines and polymers or copolymers derived from polypropylene, polyethylene, polyacrylamide or polyvinyl alcohol, lisolecithin, lecithin, dodecyl ether of pentaoxyethylene, phosphatyl dilauryl being diethanolamine, digalactose diglyceride and monogalactose diglyceride non-restrictive examples. The surfactant can also be an anionic surfactant which responds to the formula RQ wherein R is an aryl or alkyl group containing more than 6 carbon atoms, and less than 36, and Q is a sulphate, carboxylic, phosphate or sulphate group, being non-restrictive examples the dodecyl sulphate, stearic acid, Aerosol OT and phospholipids—such as phosphatyl-choline and phosphatyl diethanolamine—s can vary between 0 and 0.5.

The synthesis of these mesoporous catalysts type MCM-41 is carried out by preparing a gel of molar composition:

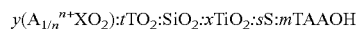

$$y(A_{1/n}{}^{n+}XO_2):tTO_2:SiO_2:xTiO_2:sS:mTAAOH$$

wherein x can vary between 0.001 and, 0.1; X corresponds to a trivalent element like for example Fe, Al, B, Ga, Cr or mixtures of these, and y lying between 0 and 0.2 and preferably between 0 and 0.1. A corresponds to one or more compensating mono-, di- or trivalent cations, or mixtures of these, n being equal to 1, 2 or 3. T corresponds to tetravalent elements other than Si and Ti, like for example V, Sn, and t lies between 0 and 1, and preferably between 0 and 0.2. S can be a cationic, anionic or neutral surfactant, and they can be any one of those previously mentioned. s can vary between 0 and 5. TAAOH refers to a hydroxide of tetraalkylammonium, tetraarylammonium or arylalkylammonium, ammonium, alkaline metal, alkaline-earths or mixtures of these. m can vary between 0 and 10.

The synthesis of these materials is carried out by preparing a solution in water, alcohol or water/alcohol mixture containing the TAAOH. To this a source of pure silicon, or in solution, is added with constant stirring, and at temperatures of between 0 and 90° C. Finally, a source of pure titanium or in solution is added to the reactive mixture. As sources of Ti and/or Si use can be made of oxides, oxyhydroxides, alcoxides, halides or any one of their salts, and in general any compound of Ti and/or Si capable of being hydrolysed under the reaction conditions. This solution also contains the surfactant. The resulting mixture is stirred until complete homogeneity for periods of times between 0.1 minutes and 60 hours, the purpose being to eliminate part or the entirety of the alcohols which could have been introduced in the synthesis gel.

The resulting mixture is introduced in an autoclave and heated to between 20 and 200° C. for a period of time of between 10 minutes and 60 hours. The final solids are separated from the mother water, washed with water, alcohol or water-alcohol mixtures and dried.

The organic material occluded in the pores of the materials can be eliminated by means of calcination at temperatures of between 300 and 1100° C., or by treatment with a mixture of one or several mineral or organic acids in a solvent which can be water, alcohol, hydrocarbons or mixtures of these. As acids, sulphuric acid, nitric acid, hydrochloric acid, perchloric acid, acetic acid, mono-, di- or tri-chloroacetic acid, mono-, di- or tri-fluoroacetic acid are preferred, these being non-restrictive examples. The object of this treatment is to extract the surfactant or any other organic residue that may be occluded inside the pores of the catalyst. This treatment is carried out at temperatures of between 0 and 250° C. in one or more successive stages of extraction, although generally two or three stages are usually sufficient to extract the entirety of the organic matter from the interior of the pores. The duration of this treatment is between 10 minutes and 40 hours depending on the acid or acid mixture employed, the extraction temperature, the solvent and the liquid/solid ratio, the preferred range for the latter being between 5 and 100 g.g$^{-1}$.

These materials have a high specific surface of between 200 and 1500 m$^2$.g$^{-1}$ and present an intense band in the UV-Vis spectrum, centred around 220 nm, which indicates the presence of Ti in tetrahedral environments.

Into these catalysts are introduced, in a stage during the synthesis, or in a post-synthesis stage, species which contain Si—C bonds, giving rise to the organic-inorganic composite which is used in the process for elimination of sulphur compounds of the present invention.

These catalysts are active and selective in oxidation reactions of sulphides in general, and of alkyl- or aryl-sulphides, thiophene, alkyl-thiophenes, benzothiophene, alkyl-benzothiophenes, di-benzothiophene, alkyl-dibenzo-thiophenes without being restrictive in particular.

Both the microporous material and the mesoporous material can be subjected, in a post-synthesis stage, generically termed silylation, and with the purpose of generating surface tetravalent element-C bonds, to a reaction with organo-metallic reagents selected from organo-titanium or organo-tin, organo-germanes or organosilanes. As organo-metallic, organogermane or organosilane reagents compounds are used which have the formula $R_1R_2R_3(R')Y$, $R_1R_2(R')_2Y$, $R_1(R')_3Y$ or $R_1R_2R_3Y$—NH—Y $R_1R_2R_3$ wherein $R_1$, $R_2$ and $R_3$ are organic groups identical to or different from each other and can be H or alkyl or aryl groups which may or may not be functionalised with amines, thiols, sulphonic groups, tetraalkylammoniums or acids, R' is preferably a group hydrolysable under the conditions of preparation preferably an alcoxide or halide group, and Y is a tetravalent element, preferably Si, Ge, Sn or Ti. In a preferred manner said reactants are organosilanes, like for example, n-alcoxysilanes, halides of n-alkyldisilanes and n-alkyl-disilazanes like hexamethyldisilazane, dipropyltetramethyldisilazane, diphenyltetramethyldisilazane, tetraphenyldimethyldisilazane, of which hexamethyl-disilazane is preferred.

It has been observed that the micro- and mesoporous silylated materials are more active for the oxidation of the sulphur compounds present in the diesel fraction. In another particular embodiment of the process of the present invention said catalyst for oxidation of sulphur compounds can be an organic-inorganic composite which consists of amorphous inorganic siliceous solids, chemically combined with Ti in proportions of between 0.2 and 8%, by weight, of Ti, in oxide form with respect to the total catalyst, and which contain silicon bonded to carbon. Said amorphous inorganic siliceous solids comprise at least 90% silica, and are preferably pyrogenic silicas selected from CAB-O—SIL and AEROSIL with specific surfaces between 40 and 450 m$^2$.g$^{-1}$ and particle size between approximately 0.007 and 0.05 microns. Other preferred amorphous inorganic siliceous solids are synthetic inorganic oxides of silica, like silica gel for example. These catalysts consisting of amorphous siliceous solids can contain, in addition to Si and Ti, other elements selected from the group consisting of V, B, Zr, Mo and mixtures of these in a percentage in total weight and in oxide form less than 8%. These catalysts can also contain quantities of between 0.01 and 4% by weight of promoters from the group consisting of alkaline metals, alkaline-earths or mixtures of these, in the oxide form.

These catalysts are subjected, in a stage during synthesis, or in a post-synthesis stage, to a silylation process giving rise to the formation of species which contain Si—C bonds, giving rise to the organic-inorganic composite which is used in the process for elimination of sulphur compounds of the present invention.

A preferred process for preparing Ti—SiO$_2$ catalysts capable of eliminating sulphur compounds from the diesel fraction, consists in treating an amorphous silica, for example of the AEROSIL type, with a compound of Ti, oxides, oxyhydroxides, alcoxides, halides or any one of the salts thereof, and preferably tetraethoxide, tetrapropoxide or tetrabutoxide of Ti.

In the process for elimination of sulphur from the diesel fraction (or synthetic mixture which simulates a gas oil) the stage of oxidation can be performed in a discontinuous reactor, a continuously stirred tank reactor (CSTR), in a fixed bed continuous reactor, in a fluidised bed reactor, or a boiling bed reactor, using organic or inorganic hydroperoxides as oxidising agents. In the case of a discontinuous reactor the ratio by weight of the diesel fraction to catalyst is between 5 and 500, and preferably between 10 and 300, the ratio by weight between the diesel fraction and oxidising agent being between 600 and 10, and preferably between 400 and 30. The process temperature lies between 20 and 150° C., and preferably between 40 and 120° C.; and the reaction time varies between 2 minutes and 24 hours. The products of the oxidation reaction are separated by distillation and/or extraction with an appropriate solvent, it being possible for the non-reacted remnant to be recycled totally or partially to the reactor.

METHODS OF EMBODIMENT OF THE INVENTION

The following examples illustrate the preparation of these materials and the application thereof to the reaction of selective oxidation of compounds with sulphur contained in the diesel fraction, and in a model mixture of sulphur compounds with hydrocarbons simulating in this way a gas oil, the respective compositions of which are the following:

| Diesel Fraction >>>>>> LCO (CEPSA) - Compostion Initial Tb (° C.) = 210.0 - Final Tb (° C.) => 300.0 | | |
| --- | --- | --- |
| Component | % by weight in mixture | S in the mixture (ppm) |
| Hydrocarbons | | |
| Aromatics | 95.8 | — |
| Iso-paraffins | — | |
| Naphthenes | — | |
| Olefins | — | |
| Paraffins | — | |
| Compounds with S | | |
| Mercaptans | 4.2 | 1 |
| Thiophene | | 0 |
| 2-Methyl-Thiophene | | 0 |
| 3-Methyl-Thiophene | | 0 |
| C2-Thiophene | | 1 |
| Tetrahydro-Thiophene | | 0 |
| C3-Thiophene | | 2 |
| C4-Thiophene | | 1 |
| Benzo-Thiophene | | 401 |
| C1-Benzothiophene | | 5841 |
| C2-Benzothiophene | | 9478 |
| C3-Benzothiophene | | 9911 |
| C4-Benzothiophene | | 2628 |
| Di-benzothiophene | | 1177 |
| C1-dibenzothiophene | | 5355 |
| C2-Dibenzothiophene | | 6969 |
| C3-Dibenzo-thiophene | | — |
| S in LCO (ppm) = | | 41764 |

| Synthetic mixture: Composition | | |
| --- | --- | --- |
| Component | % by weight in mixture | S in the mixture (ppm) |
| Hydrocarbons | | |
| Aromatics | 99.9 | — |
| Iso-paraffins | | |
| Paraffins | | |
| Compounds with S | | |
| Thiophenics | 0.1 | 0 |
| Alkylthiophenics | | 0 |
| Benzothiophene | | 300 |
| Alkylbenzothiophene | | 300 |
| Dibenzothiophene | | 300 |
| Alkyldibenzothiophene | | 0 |
| S in mixture (ppm) = | | 900 |

Diesel obtained by hydrotreatment of an LCO fraction, LCO (Hydrotreated).

| Initial Tb (° C.) = 207.1 Final Tb (° C.) => 351.6 (determined according to the standard D-2887) | | |
| --- | --- | --- |
| Component | % by weight in mixture | S in the mixture (ppm) |
| Hydrocarbons | | |
| Aromatics | 99.998 | — |
| Iso-paraffins | — | |
| Naphthenes | — | |
| Olefins | — | |
| Paraffins | — | |
| Compounds with S | | |
| Mercaptans | 0.002 | 0 |
| Thiophene | | 0 |
| Tetrahydro-Thiophene | | 0 |
| Alkylthiophenes | | 0 |
| Benzothiophene | | 0.3 |
| Alkylbenzothiophene | | 0 |
| Dibenzothiophene | | 1.3 |
| Alkyldibenzothiophene | | 20.6 |
| S in LCO (ppm) = | | 22.1 |

In all cases the detection of the sulphur compounds was carried out by means of the analysis of the reactive mixtures by gas chromatography with a pulsed flame photometric detector PFPD (Special Detector S).

EXAMPLE 1

Preparation of a Beta Type Microporous Material Containing Ti in its Composition, in Presence of F⁻ Anions 35 g of tetraethylorthosilicate (TEOS) were hydrolysed in 41.98 g of tetraethylammonium hydroxide (TEAOH, 35% aqueous solution) and 5.96 g of $H_2O_2$; (35%). Next 3.83 g of Titanium tetraethoxide was added, stirring the resulting mixture and evaporating the ethanol formed in the hydrolysis of the TEOS. 4.15 g of HF were added next (48% aq. sol.) and a suspension of zeolite Beta seeds (0.4 g of dealuminated zeolite Beta in 2 g of water). The molar composition of the gel was the following:

$TiO_2$:10 $SiO_2$:6 TEAOH:3.6 $H_2O_2$:80 $H_2O$:6 HF

The resulting mixture was heated in autoclaves lined internally with PTFE to 140° C. and during the heating the autoclaves were kept in rotation (60 rpm). After 20 days of heating, the mixture (pH=8.7) was filtered and 23 g of zeolite Beta of high crystallinity was obtained (better than 90% in comparison with a standard) for each 100 g of gel. The Ti content of the zeolite in its calcined and anhydrous form determined by chemical analysis was 7.3%, expressed as $TiO_2$.

EXAMPLE 2

Activation of a Catalyst like that Described in Example 1 by Calcination

This example illustrates the calcination of the zeolite Beta described in the previous example to produce the catalyst which will be used in the reaction of selective oxidation of compounds containing sulphur.

The solid obtained in the previous example is calcined in an air atmosphere at 580° C. for 3 hours. The X-ray diffraction pattern of the solid obtained indicated that the crystallinity of the material had been maintained.

EXAMPLE 3

Use of a Material like that Described in Example 2 as Selective Catalyst in the Reaction of Selective Oxidation of Sulphur Compounds Present in Synthetic Mixture 50 mg of a material like that described in example 2 was introduced in a glass reactor at 80° C. which contained 15000 mg of model mixture and 80 mg of hydrogen peroxide (35% solution). The reaction mixture was stirred and a sample was taken after 7 hours of reaction. Of the total converted oxidising agent, 30% was used to oxidise the sulphur compounds, a conversion into sulphurated products being obtained of 29.6%, the initial and final compositions in sulphur content for the reaction mixture being the following:

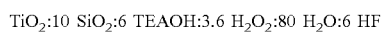

|  | S in Mixture (ppm) Special Detector S |
|---|---|
| Initial | 900 |
| Final | 634 |
| Conv. (%) = | 29.6 |

Example 3a

Use of a Material like that Described in Example 2 as Selective Catalyst in the Reaction of Selective Oxidation of Sulphur Compounds Present in the LCO Diesel Fraction 200 mg of a material like that described in example 2 was introduced in a glass reactor at 80° C. which contained 5000 mg of LCO diesel fraction and 200 mg of hydrogen peroxide (Sol., 35%). The reaction mixture was stirred and a sample taken after 7 hours of reaction. Of the total converted oxidising agent, 30% was used to oxidise the sulphur compounds, a conversion into sulphurated products being obtained of 16.8%. The resulting final mixture was filtered and subjected to a liquid-liquid extraction, using 1000 mg of dimethyl sulphoxide (DMSO) as solvent, to increase the elimination of the sulphurated compounds in the treated fraction, and these values were compared with those obtained by direct extraction from the reaction mixture, without having been subjected it to the process of oxidation. The initial and final compositions in sulphur content for the reaction mixture are the following:

|  | S in LCO (ppm) | | |
|---|---|---|---|
|  |  | Without catal. Before | extraction after |
| Initial | 41764 | 35861 | 15702 |
| Final | 34778 |  | 19973 |
| Conv. (%) | 16.8 |  | 52.2 |

EXAMPLE 4

Preparation of a Beta Type Microporous Material Containing Ti in its Composition, in Absence of F⁻ Anions 30 g of tetraethylorthosilicate (TEOS) were hydrolysed in 34.9 g of tetraethylammonium hydroxide (TEAOH, 35% aqueous solution) and 4.93 g of $H_2O_2$ (35%). Next 2.19 g of Titanium tetraethoxide was added and the mixture was stirred, evaporating the ethanol formed in the hydrolysis of the TEOS. A suspension of zeolite Beta seeds was added next (0.34 g of dealuminated zeolite Beta in 1.5 g of water). The molar composition of the gel is the following:

$TiO_2$:15 $SiO_2$:8.6 TEAOH:5.3 $H_2O_2$; 107 $H_2O$

The resulting mixture was heated in autoclaves lined internally with PTFE to 140° C. and during the heating the autoclaves were kept in rotation (60 rpm). After 20 days of heating the mixture (pH=11.8) was centrifuged and 26.7 g of zeolite Beta of high crystallinity was obtained (better than 90% in comparison with a standard) for each 100 g of gel. The content in titanium of the zeolite in its calcined and anhydrous form, determined by chemical analysis, was 8.5%, expressed as $TiO_2$.

EXAMPLE 5

Activation of a Catalyst like that Described in Example 4 by Calcination

This example illustrates the calcination of the zeolite Beta described in the previous example to produce the catalyst which will be used in the reaction of selective oxidation of compounds containing sulphur.

The solid obtained in the previous example was calcined in an air atmosphere at 580° C. for 3 hours. The X-ray diffraction pattern of the solid obtained indicated that a loss of crystallinity had taken place in the material of around 25%.

EXAMPLE 6

Use of a Material like that Described in Example 5 as Selective Catalyst in the Reaction of Selective Oxidation of Sulphur Compounds Present in Synthetic Mixtures 50 mg of a material like that described in the example 5 was introduced in a glass reactor at 80° C. which contained 15000 mg of model mixture, and 80 mg of hydrogen peroxide (35% solution). The reaction mixture was stirred and a sample was taken after 7 hours of reaction. Of the total converted oxidising agent, 40% was used to oxidise the sulphur compounds, a conversion into sulphurated products of 19.6% being obtained, the initial and final compositions in sulphur content for the reaction mixture being the following:

|  | S in Mixture (ppm) Special Detector S |
|---|---|
| Initial | 900 |
| Final | 723 |
| Conv. (%) = | 19.6 |

EXAMPLE 7

Preparation of an MCM-41 Type Mesoporous Material Containing Ti in its Composition 3.11 g of cetyltrimethylammonium bromide (CTAB) was dissolved in 20.88 g of water. To this solution 5.39 g of tetramethylammonium hydroxide (TMAOH) and 0.21 g of titanium tetraethoxide (TEOT) were added, and it was stirred until the titanium had completely dissolved. Later, 3.43 g of silica was added resulting in a gel that was stirred at ambient temperature for 1 hour at 250 r.p.m. The resulting mixture was introduced in autoclaves and heated to 100° C. at the autogenous pressure of the system for 48 hours. After this time had elapsed, a solid was recovered by filtration, thorough washing with distilled water and drying at 60° C. for 12 hours.

EXAMPLE 8

Activation of a Catalyst like that Described in Example 7 by Calcination 3.00 g of material described in example 7 was placed in a quartz tubular reactor, and a current of dry nitrogen of 50 ml.min$^{-1}$ was made to pass while the temperature was raised to 540° C. at 3° C.min$^{-1}$. When the temperature was reached, nitrogen was passed for 60 minutes, after which time the nitrogen flow was changed for a flow of dry air of 50 ml.min$^{-1}$. The calcination was prolonged for 360 minutes more and the solid was cooled to ambient temperature. This thermal treatment allowed complete elimination of all the organic matter occluded in the pores of the material.

This solid had a specific surface of 950 m$^2$.g$^{-1}$, as well as a band in the UV-Vis spectrum centred at 220 nm.

EXAMPLE 9

Silylation of a Material like that Described in Example 8

2.0 g of the sample obtained in example 8 was dehydrated at 100° C. and 10$^{-3}$ Torr for 2 hours. The sample was cooled, and a solution of 1.88 g of hexamethyl disilazane $(CH_3)_3Si$—NH—$Si(CH_3)_3$ in 30 g of toluene was added at room temperature. The resulting mixture was refluxed at 120° C. for 90 minutes and washed with toluene. The end product was dried at 60° C.

This solid had a specific surface of 935 m$^2$.g$^{-1}$, as well as a band in the UV-Vis spectrum centred at 220 nm. Also the spectrum of $^{29}$Si-MAS-RMN had a resonance band at −10 ppm attributed to the presence of Si—C bonds.

EXAMPLE 10

Use of a Material like that Described in Example 9 as Selective Catalyst in the Reaction of Selective Oxidation of Sulphur Compounds Present in Model Mixture 50 mg of a material like that described in example 10 were introduced in a glass reactor at 80° C. which contained 15000 mg of the model mixture and 65 mg of t-butyl hydroperoxide. The reaction mixture was stirred and a sample was taken after 7 hours of reaction. Of the total converted oxidiser, 37% was used to oxidise the sulphur compounds, a conversion into sulphurated products being obtained of 49.4%, the initial and final compositions in sulphur content for the reaction mixture being the following:

|  | S in Mixture (ppm) Special Detector S |
|---|---|
| Initial | 900 |
| Final | 455 |
| Conv. (%) = | 49.4 |

EXAMPLE 11

Activation of a Material like that Described in Example 7 by Chemical Extraction 5.5 g of sample like that described in example 1 were treated with 276.4 g of a solution of 0.05 M sulphuric acid in ethanol. This suspension was stirred under reflux for one hour. The solid was recovered by filtration and washed with ethanol until a neutral pH was reached. The resulting solid was dried at 100° C. for 30 minutes, 3.51 g of product being obtained. The resulting solid was subjected to a second extraction stage in which the 3.5 g of solid was added to a solution of 0.15 M hydrochloric acid in Ethanol/heptane (48:52), a liquid/solid ratio of 50 being used. This suspension was refluxed with constant agitation for 24 hours, being filtered and washed with ethanol. The resulting solid was dried at 60° C. for 12 hours.

This solid had a specific surface of 983 m².g⁻, as well as a band in the UV-Vis spectrum centred at 220 nm.

EXAMPLE 12

Silylation of a Material like that Described in Example 11

2.0 g of the sample obtained in example 11 was dehydrated at 100° C. and $10^{-3}$ Torr for 2 hours. The sample was cooled, and a solution of 1.88 g of hexamethyl disilazane $(CH_3)_3Si$—NH—$Si(CH_3)_3$) in 30 g of toluene was added at room temperature. The resulting mixture was refluxed at 120° C. for 90 minutes and washed with toluene. The end product was dried at 60° C.

This solid had a specific surface of 965 $m^2.g^{-1}$, as well as a band in the UV-Vis spectrum centred at 220 nm. Also the spectrum of $^{29}$Si-MAS-RMN had a resonance band at −10 ppm attributed to the presence of Si—C bonds.

EXAMPLE 13

Use of a Material like that Described in Example 12 as Selective Catalyst in the Reaction of Selective Oxidation of Sulphur Compounds Present in Model Mixture 50 mg of a material like that described in example 12 were introduced in a glass reactor, at 80° C., which contained 15000 mg of the model mixture and 65 mg of t-butyl hydroperoxide. The reaction mixture was stirred and a sample was taken after 7 hours of reaction. Of the total converted oxidiser, 63% was used to oxidise the sulphur compounds, a conversion into sulphurated products, 99.0%, being obtained, the initial and final compositions in sulphur content for the reaction mixture being the following:

|  | S in Mixture (ppm) Special Detector S |
|---|---|
| Initial | 900 |
| Final | 9 |
| Conv. (%) = | 99.6 |

EXAMPLE 13a

Use of a Material like that Described in Example 12 as Selective Catalyst in the Reaction of Selective Oxidation of Sulphur Compounds Present in the LCO Diesel Fraction 200 mg of a material like that described in example 12 was introduced in a glass reactor at 80° C. which contained 5000 mg of the LCO diesel fraction and 200 mg of t-butyl hydroperoxide. The reaction mixture was stirred and a sample was taken after 7 hours of reaction. Of the total converted oxidiser, 47% was used to oxidise the sulphur compounds, a conversion of 29.2% into sulphurated products being obtained. The resulting final mixture was filtered and subjected to a liquid-liquid extraction, using 1000 mg dimethylsulphoxide (DMSO) as solvent, to increase the elimination of the sulphurated compounds in the treated fraction, and these values were compared with those obtained by direct extraction from the reaction mixture without having been subjected it to the process of oxidation. The initial and final compositions in sulphur content for the reaction mixture were the following:

|  | S in LCO (ppm) | | |
|---|---|---|---|
|  | Without catal Before | | Extraction after |
| Initial | 41764 | 33319 | 15702 |
| Final | 29560 | | 8977 |
| Conv. (%) | 29.2 | | 78.5 |

EXAMPLE 14

Use of a Mechanical Mixture of the Materials Described in Examples 5 and 12 as Selective Catalyst in the Reaction of Selective Oxidation of Sulphur Compounds Present in Model Mixture 50 mg of a mechanical mixture (50/50 by weight) of the materials described in examples 5 and 12 were introduced in a glass reactor at 80° C. which contained 15000 mg of the model mixture and 80 mg of hydrogen peroxide (35% solution) which were added slowly during 3.5 hours. The reaction mixture was stirred and a sample was taken after 7 hours of reaction. Of the total converted oxidiser, 50% was used to oxidise the sulphur compounds, a conversion of 77.0% into sulphurated products being obtained, the initial and final compositions in content of sulphur for the reaction mixture being the following:

|  | S in Mixture (ppm) Special Detector S |
|---|---|
| Initial | 900 |
| Final | 207 |
| Conv. (%) = | 77.0 |

EXAMPLE 14a

Use of a Mechanical Mixture of the Materials Described in Examples 5 and 12 as Selective Catalyst, in the Reaction of Selective Oxidation of Sulphur Compounds Present in Model Mixture 50 mg of a mechanical mixture (50/50 by weight) of the materials described in examples 5 and 12 were introduced in a glass reactor at 80° C. which contained 15000 mg of the mixture model and 65 mg of t-butyl hydroperoxide. The reaction mixture was stirred and a sample was taken after 7 hours of reaction. Of the total converted oxidiser, 57% was used to oxidise the sulphur compounds, a conversion of 99.9% into sulphurated products being obtained, the initial and final compositions in content of Sulphur for the reaction mixture being the following:

| | S in Mixture (ppm)<br>Special Detector S |
|---|---|
| Initial | 900 |
| Final | 1 |
| Conv. (%) = | 99.9 |

EXAMPLE 15

Preparation of a Material of the Amorphous $SiO_2$ Type Containing Ti in its Composition A titanium compound was anchored on the surface of an amorphous silica (Aerosil), of specific surface of approximately 400 $m^2.g^{-1}$ (60-200 mesh), according to the following process: 5 g of $SiO_2$ were dehydrated at 300° C. and $10^{-3}$ min of Hg for 2 hours, a solution being added which contained 0.079 g of titanocene dichloride in 45 g of anhydrous chloroform. The resulting suspension was stirred at ambient temperature for 1 hour in an atmosphere of Ar. To this suspension was added a solution which contained 0.063 g of triethylamine in 10 g of chloroform. Release of white gases was observed and the colour of the solution changed from orangey red to orangey yellow. The stirring was prolonged for 1 hour. The solid was recovered by filtration and the excess of reagents was eliminated by thorough washing with dichloromethane and drying at 60° C. for 12 hours.

EXAMPLE 16

Use of a Material like that Described in Example 15 as Selective Catalyst in the Reaction of Selective Oxidation of Sulphur Compounds Present in Model Mixture 50 mg of a material like that described in example 15 was introduced in a glass reactor at 80° C. which contained 15000 mg of the model mixture and 80 mg of hydrogen peroxide (35% solution). The reaction mixture was stirred and a sample was taken after 7 hours of reaction. Of the total converted oxidiser, 30% was used to oxidise the sulphur compounds, a conversion of 45.5% into sulphurated products being obtained, the initial and final compositions in sulphur content for the reaction mixture being the following:

| | S in Mixture (ppm)<br>Special Detector S |
|---|---|
| Initial | 900 |
| Final | 491 |
| Conv. (%) = | 45.5 |

EXAMPLE 17

Use of a Material like that Described in Example 2 as Selective Catalyst in the Reaction of Selective Oxidation of Sulphur Compounds Present in the LCO Diesel Fraction (Hydrotreated)

10 mg of a material like that described in example 2 was introduced in a glass reactor at 80° C. which contained 5000 mg of LCO diesel fraction (hydrotreated) and 25 mg of hydrogen peroxide (35% Sol.). The reaction mixture was stirred and a sample was taken after 7 hours of reaction. Of the total converted oxidiser, 33% was used to oxidise the sulphur compounds, a conversion into sulphurated products being obtained of 75.0%. The oxidised sulphur compounds can be eliminated easily from the mixture by means of filtration of the catalyst and liquid-liquid extraction with DMSO or t-butyl ether. The initial and final compositions in content of sulphur for the reaction mixture were the following:

| | S in LCO (obtained by hydrotreatment) (ppm)<br>Special detector S |
|---|---|
| Initial | 22.0 |
| Final | 5.5 |
| Conv. (%) = | 75.0 |

EXAMPLE 18

Use of a Material like that Described in Example 12 as Selective Catalyst in the Reaction of Selective Oxidation of Sulphur Compounds Present in the LCO Diesel Fraction (Hydrotreated)

10 mg of a material like that described in example 13 was introduced in a glass reactor at 80° C. which contained 5000 mg of the LCO diesel fraction (hydrotreated) and 20 mg of t-butyl hydroperoxide. The reaction mixture was stirred and a sample was taken after 7 hours of reaction. Of the total converted oxidiser, 67% was used to oxidise the sulphur compounds, a conversion of 82.0% into sulphurated products being obtained. The oxidised sulphur compounds can be easily eliminated from the mixture by means of filtration of the catalyst and liquid-liquid extraction with DMSO or t-butyl ether. The initial and final compositions in Sulphur content for the reaction mixture were the following:

| | S in LCO (obtained by hydrotreatment) (ppm)<br>Special detector S |
|---|---|
| Initial | 22.0 |
| Final | 2.7 |
| Conv. (%) = | 82.0 |

The invention claimed is:

1. A process for the elimination of sulphur compounds from a diesel fraction which comprises subjecting said sulphur compounds to an oxidation reaction using as oxidising agent at least one hydroperoxide selected from organic hydroperoxides and inorganic hydroperoxides, in the presence of a catalyst, characterized in that the catalyst is at least one organic-inorganic composite which comprises at least:
   Si,
   Ti, and
   Silicon bonded to carbon.

2. A process according to claim 1, characterized in that the catalyst is a combination of a plurality of different organic-inorganic composites, each organic-inorganic composite comprising:

Si,
Ti, and
Silicon bonded to carbon.

3. A process according to claim 1, characterized in that said organic-inorganic composite has been obtained by means of a process wherein a reagent which contains Si—C groups has been added during the synthesis stage.

4. A process according to claim 1, characterized in that said organic-inorganic composite has been obtained by means of a process which comprises a post-synthesis silylation stage.

5. A process according to claim 1, characterized in that said organic-inorganic composite is a microporous molecular sieve which comprises Si—C bonds.

6. A process according to claim 5, characterized in that said microporous molecular sieve is a molecular sieve with pores formed by rings with at least 12 members selected from zeolites, ALPO and SAPO.

7. A process according to claim 6, characterized in that said microporous molecular sieve is selected from the group consisting of Ti-Beta, Ti-ITQ-7, Ti-UTD-1, Ti-Mordenite, Ti-ALPO-5 and Ti-SAPO-5.

8. A process according to claim 6, characterized in that said microporous molecular sieve is selected from the group consisting of polymorphs of zeolite Beta, and combinations thereof.

9. A process according to claim 5, characterized in that said microporous molecular sieve which comprises Si—C bonds, has the following chemical formula in its calcinated and anhydrous state:

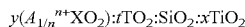

where:
X represents at least a trivalent element,
y lies between 0 and 0.2,
A represents mono-, di- or trivalent cations, or combinations of these,
n=1, 2 or 3,
T represents at least one tetravalent element other than Si and Ti,
t lies between 0 and 1, and
x lies between 0.0001 and 1.

10. A process according to claim 5, characterized in that said microporous molecular sieve has been synthesised in the presence of compounds which contain Si—C groups.

11. A process according to claim 5, characterized in that said microporous molecular sieve has been subjected to a stage of post-synthesis silylation wherein Si—C bonds are created.

12. A process according to claim 7, characterized in that said microporous molecular sieve has been synthesised in a medium selected from media which comprise F— and media which comprise OH— anions.

13. A process according to claim 9, characterized in that said trivalent element X is selected from the group consisting of Fe, Al, B, Ga, Cr and combinations thereof.

14. A process according to claim 9, characterized in that said tetravalent element T is selected between V and Sn.

15. A process according to claim 9, characterized in that t lies between 0 and 0.2.

16. A process according to claim 9, characterized in that x lies between 0.001 and 1.

17. A process according to claim 1, characterized in that said organic-inorganic composite is a mesoporous molecular sieve which comprises Si—C bonds.

18. A process according to claim 17, characterized in that the mesoporous molecular sieve employed as catalyst has been obtained from a precursor which has the chemical formula:

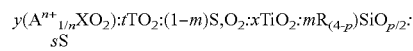

where:
x lies between 0.005 and 0.1;
X represents at least a trivalent element,
y lies between 0 and 0.2,
A represents one or more mono-, di- or trivalent compensating cations, or mixtures of these,
n=1, 2 or 3,
T represents tetravalent elements other than Si and Ti,
t lies between 0 and 1, and preferably between 0 and 0.2,
S represents an organic compound,
s can vary between 0 and 0.5,
m lies between 10-6 and 0.66,
p lies between 3 and 1,
and wherein R is an alkyl or aromatic group, or a combination both, which comes from the silylation agent which contains the Si—C bonds.

19. A process according to claim 18, characterized in that, in order to obtain the mesoporous molecular sieve, the organic compound represented by S has been extracted chemically.

20. A process according to claim 17, characterized in that the mesoporous molecular sieve has been subjected to a post-synthesis treatment with a silylation agent in order to create new Si—C bonds.

21. A process according to claim 17, characterized in that said mesoporous molecular sieve is selected from the groups consisting of Ti-MCM-41, Ti-MCM-48, Ti-HMS, Ti-SBA-15 and Ti-TUD-1.

22. A process for the elimination of sulphur compounds from the diesel fraction according to claim 17, characterized in that the mesoporous molecular sieve employed as catalyst has been prepared based on a precursor which has the chemical formula:

wherein:
x lies between 0.005 and, 0.1;
X represents at least one trivalent element,
y lies between 0 and 0.2,
A represents to one or more compensating mono-, di- or trivalent cations, or mixtures of these,
n=1, 2 or 3,
T represents tetravalent elements other than Si and Ti,
t lies between 0 and 1, and preferably between 0 and 0.2,
S represents an organic compound and
s can vary between 0 and 5.

23. A process according to claim 22, characterized in that said trivalent element is selected from Fe, Al, B, Ga, Cr and combinations thereof.

24. A process according to claim 22, characterized in that said tetravalent element T is selected between V and Sn.

25. A process according to claim 22, characterized in that t lies between 0 and 0.2.

26. A process according to claim 22, characterized in that S is a surfactant selected from cationic surfactants, ionic surfactants and neutral surfactants.

27. A process according to claim 22, characterized in that S is a cationic surfactant selected from:
a compound with the formula $R^1R_2R_3R_4Q^+$ wherein Q is nitrogen or phosphorus, at least one of the substituents $R_1$, $R_2$, $R_3$ or $R_4$ is an aryl or alkyl group containing more than 6 carbon atoms and less than 36, and each of the remaining groups $R_1$, $R_2$, $R_3$ or $R_4$ is a hydrogen atom or an aryl or alkyl group with less than five carbon atoms, a geminal surfactant with formula $R_1R_2R_3QR_4QR_1R_2R_3$ or $R_1R_2R_3Q(R_4R_5QR_6QR_4R_5)QR_1R_2R_3$ where Q is a nitrogen or phosphorus atom and at least one of the substituents $R_1$—$R_6$ is an aryl or alkyl group with more than six carbon atoms and less than 36, and each of the remaining groups $R_1$—$R_6$ are hydrogen atoms or aryl or alkyl groups with less than five carbon atoms, or mixtures of these, or two of the groups, $R_1$, $R_2$, $R_3$ or $R_4$ can be interconnected giving rise to cycled compounds.

28. A process according to claim 22, characterized in that S is a cationic surfactant selected from the group consisting of cetyltrimethylammonium, dodecyltrimethylammonium, cetylpyridinium and cetyltrimethylphosphonium.

29. A process according to claim 22, characterized in that S is a cationic surfactant which has been introduced into a synthesis gel from which the precursor is prepared, in form of hydroxide, halide, nitrate, sulphate, carbonate or silicate and combinations thereof.

30. A process according to claim 22, characterized in that S is a neutral surfactant selected from the group consisting of:
  a compound with the formula $R_1R_2R_3Q$ where Q is nitrogen or phosphorus, at least one of the substituents $R_1$, $R_2$ or $R_3$ is an aryl or alkyl group containing more than 6 carbon atoms and less than 36, and each of the remaining groups $R_1$, $R_2$, or $R_3$ is a hydrogen atom or an aryl or alkyl group with less than five carbon atoms,
  a compound having the formula nR-EO which consists of alkylpolyethylene oxides, alkyl-aryl-polyethylene oxides and copolymers of alkylpolypropylene and alkylethylene, TERGITOL 15-S-9, TRITON X-114, IGEPAL RC-760, PLURONIC 64 L, TETRONIC and SORBITAN,
  esters derived from fatty acids obtained through reaction with short-chain alcohols, sugars, amino acids and amines, and
  polymers or copolymers derived from polypropylene, polyethylene, polyacrylamide or polyvinyl alcohol.

31. A process according to claim 22, characterized in that S is a neutral surfactant selected from the group consisting of lisolecithin, lecithin, dodecyl ether of pentaoxyethylene, phosphatidyldilauryldiethanolamine, digalactose diglyceride and monogalactose diglyceride.

32. A process according to claim 22, characterized in that S is a neutral surfactant selected from the group consisting of dodecylamine, cetylamine and cetylpiridine.

33. A procedure according to claim 32, characterized in that S is an anionic surfactant of formula $RQ^-$ wherein R is an aryl or alkyl group containing more than 6 carbon atoms and less than 36, and Q is a group selected from sulphate groups, carboxylic groups and phosphate groups.

34. A process according to claim 22, characterized in that S is an anionic surfactant selected from the group consisting of dodecyl sulphate, stearic acid, Aerosol OT and phospholipids.

35. A process according to claim 22, characterized in that S is an anionic surfactant selected between phosphatyl choline and phosphatyl diethanolamine.

36. A process according to claim 22, characterized in that, to obtain the mesoporous molecular sieve, the organic compound represented by S was extracted from the precursor by calcination in a gas selected from air, $N_2$ and inert gases at temperatures between 300° and 700° C., and Si—C bonds were obtained by means of a silylation treatment carried out thereafter.

37. A process according to claim 22, characterized in that, to obtain the mesoporous molecular sieve, said organic compound represented by S was extracted from the precursor chemically, and Si—C bonds were obtained by means of a silylation treatment carried out thereafter.

38. A process according to claim 37, characterized in that said organic compound was extracted by treatment with a solution of an acid selected between mineral acids and organic acids, in a solvent selected from the group consisting of water, alcohols, hydrocarbons, and mixtures thereof.

39. A process according to claim 22, characterized in that said mesoporous molecular sieve comprises Ge, V, Sn, or combinations thereof, in addition to Si and Ti.

40. A process according to claim 38, characterized in that said mesoporous molecular sieve comprises, in addition, Al, B, Ga, Fe, Cr, or combinations thereof.

41. A process according to claim 1, characterized in that said organic-inorganic compound is selected from the group of amorphous inorganic siliceous solids, chemically combined with Ti in proportions of between 0.2 and 8% by weight of Ti, in oxide form, with respect to the total catalyst, and which contain silicon bonded to carbon.

42. A process according to claim 41, characterized in that said amorphous inorganic siliceous solids comprise at least 90% silica.

43. A process according to claim 41, characterized in that said amorphous inorganic siliceous solids are pyrogenic silicas selected between CAB-O-SIL and AEROSIL with specific surfaces between 40 and 450 $m^2.g^{-1}$ and particle size between approximately 0.007 and 0.05 microns.

44. A process according to claim 42, characterized in that said amorphous inorganic siliceous solids are synthetic inorganic oxides of silica.

45. A process according to claim 44, characterized in that said synthetic inorganic oxide of silica is silica gel.

46. A process according to claim 41, characterized in that said siliceous solid contains in addition to Si and Ti, other elements selected from the group consisting of V, B, Zr, Mo and mixtures of these, in a percentage of less than 8%, by total weight, and in oxide form.

47. A process according to claim 41, characterized in that said siliceous solid comprises quantities of between 0.01 and 4%, by weight, of at least one promoter selected from the group consisting of alkaline metals, alkaline-earth metals and combinations of these, in oxide form.

48. A process according to claim 1, characterized in that said oxidation reaction is performed in a reactor selected from the group consisting of a discontinuous reactor, a continuously stirred tank reactor (CSTR), a fixed bed continuous reactor, a fluidised bed reactor and a boiling bed reactor.

49. A process according to claim 48, characterized in that said oxidation is performed in a discontinuous reactor, with a ratio of the diesel fraction to catalyst of between 5 and 500 by weight, and a ratio between the diesel fraction and oxidising agent of between 600 and 10 by weight.

50. A process according to claim 49, characterized in that said ratio of the diesel fraction to catalyst lies between 10 and 300 by weight.

51. A process according to claim 49, characterized in that said ratio of the diesel fraction to oxidising agent lies between 400 and 30 by weight.

52. A process according to claim 1, characterized in that said oxidation reaction is performed at a temperature of between 20 and 150° C.

53. A process according to claim 52, characterized in that said oxidation reaction is performed at a temperature of between 40 and 120° C.

54. A process according to claim 1, characterized in that said oxidation reaction is produced in a reaction time of between 2 minutes and 24 hours.

55. A process according to claim 1, characterized in that said oxidation reaction comprises a separation of the products by means of a stage selected from the group consisting of distillation, extractions and combinations thereof, with a solvent, and an, at least, partial recycling of products which have not reacted, to the reactor.

* * * * *